March 14, 1967 J. D. THEIS 3,309,505
METAL BELT CARD READER
Filed April 30, 1962 3 Sheets-Sheet 1

INVENTOR.
Jack D. Theis
By Smyth, Roston & Pavitt
Attorneys

March 14, 1967   J. D. THEIS   3,309,505
METAL BELT CARD READER
Filed April 30, 1962   3 Sheets-Sheet 2
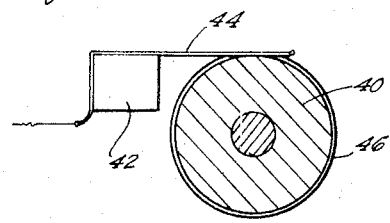
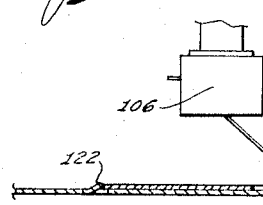
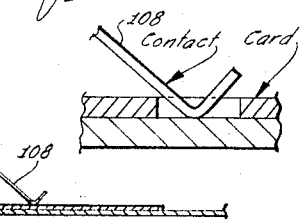
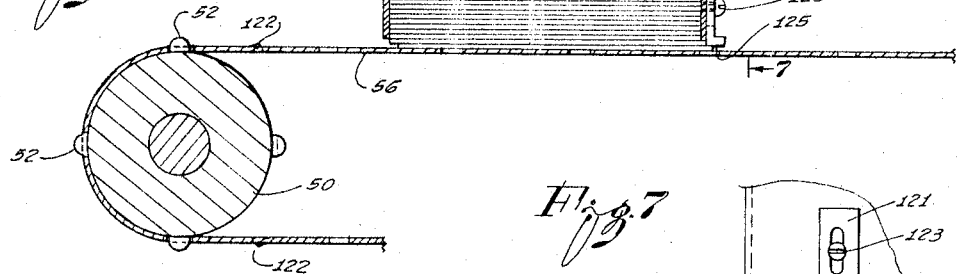
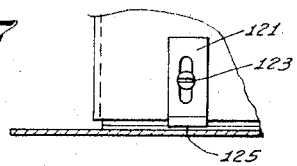
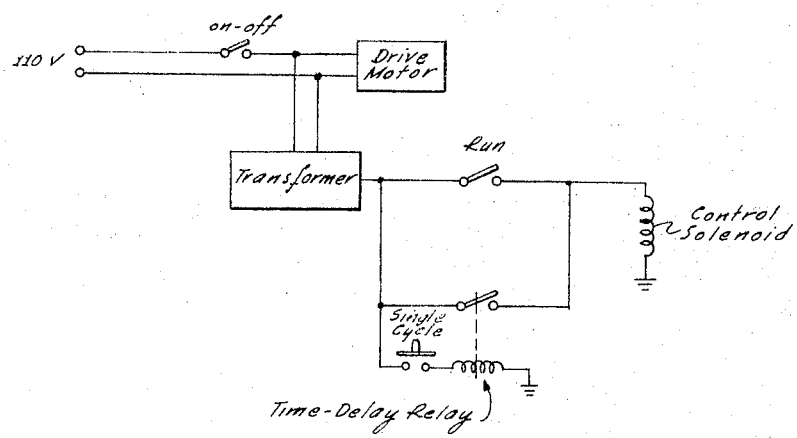
INVENTOR:
Jack D. Theis
By Smyth, Roston & Pavitt
Attorneys March 14, 1967
J. D. THEIS
3,309,505
METAL BELT CARD READER
Filed April 30, 1962
3 Sheets-Sheet 3
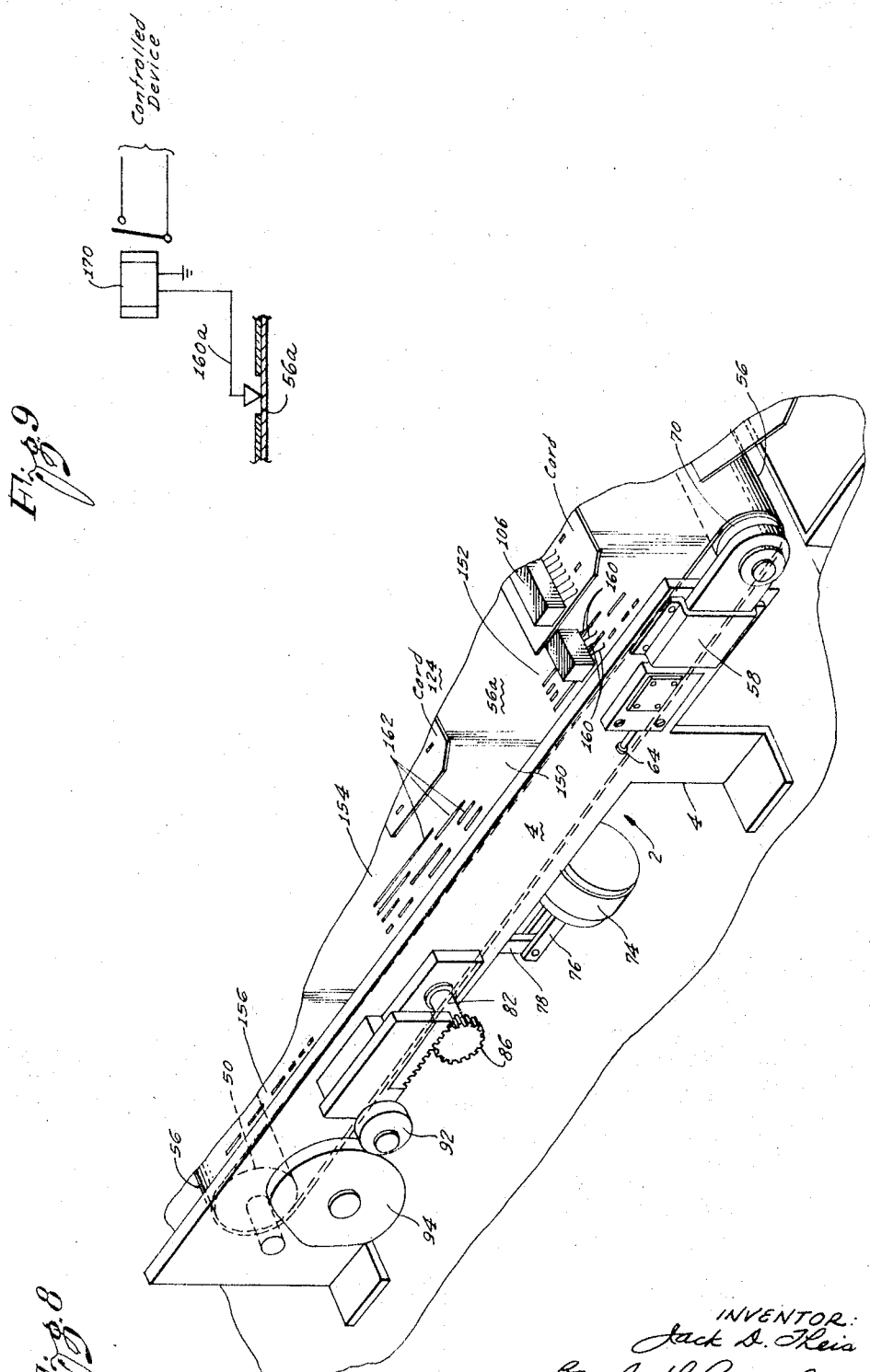
INVENTOR:
Jack D. Theis

United States Patent Office 3,309,505
Patented Mar. 14, 1967

3,309,505
METAL BELT CARD READER
Jack D. Theis, Manhattan Beach, Calif., assignor, by mesne assignments, of sixty percent to Elliot F. Beidman, Manhattan Beach, Calif., twenty percent to Wayne J. King, Calabasas, Calif., and twenty percent to Bertram R. Newman, Sherman Oaks, Calif.
Filed Apr. 30, 1962, Ser. No. 190,909
16 Claims. (Cl. 235—61.11)

The invention relates to equipment having particular utility in the art of information retrievers and is specifically directed to novel structure known in the art as "a card reader."

Modern business techniques require the storage and retrieval of a high degree of relatively complex information relating to business activities. For example, it is the modern business practice to provide continuous inventory control by the simple device of storing inventory information on appropriately punched cards and at any given point of time, retrieving and totalizing any such available information. The same informative device is available in virtually any facet of the business operation including such items as direct and indirect labor, overhead, sales expense, advertising expense, work in process, raw materials, finished goods, etc. Relative to the term "reading," it will be understood that as herein referred to means providing appropriate equipment for sensing the stored information on a given card or group of cards in relation to an appropriate control device whereby the related information may be gathered and totalized and thereby reduced to some determinable conclusions relative thereto.

The problem of card reading is one that initially involves a requirement of a high degree of accuracy in information retrieval. Additionally, and in view of the large volume of cards reasonably employed, a further problem is presented, i.e., the rapidity at which the information on the given cards may be collected. Heretofore, the card readers employed have embraced a variety of designs. Typically, the arrangements have contemplated individual manual feeding of cards of a given group through the related equipment and, thereafter, manual restacking of the cards so processed. Other devices have employed a reading drum of generally cylindrical form whereby the cards may be either manually or automatically passed thereover, being guided by appropriate rollers or the like and moved intermediate the drum and appropriate brush contacts which, in turn, are arranged to complete selected electrical circuits by passage of the brush contacts through holes in the card. The electrical circuit is completed by brush engagement with related conducting bars on the drum.

Those skilled in the art will understand that information cards are two-dimensional with the shorter card dimension incremented in rows and the longer card dimension incremented in columns. To effectively retrieve information from holes accurately punched within an information card or other indicia physically located on the card, it is necessary to accurately determine the physical locale of a given hole in a card. In short, it is necessary to determine, at the instant of reading, in which row and column a given hole lies. In order to accomplish this multi-dimensional control, reading devices heretofore used in the art have employed, for example, a wire brush adapted to complete an electrical circuit or a photoelectric device having similar functional characteristics arranged, upon the appearance of a hole in a card to be read, to establish one dimensional location. Prior art devices frequently located the other dimension by using a rotatable cam driven electrical contact to sequentially engage a plurality of arcuately arranged contacts, said cam driven contact having a speed directly correlated with the motion of the card relative to the timed interval of read-out of the primary sensing device.

The present invention is a card reader which accomplishes the functions described above in a manner which differs in several basic respects from all previous reading devices. Principal differences stem from the concept of utilizing a continuous belt which is stretched on rollers. The belt is utilized in the function of:

(1) Picking cards to be read one at a time from a stack of cards located in a hopper or magazine;
(2) Transporting the cards to a reading station;
(3) Cooperating in accomplishing and recording the sensing or reading function; and
(4) Transporting the cards from the reading station and depositing them into a card reservoir or stacker.

The particular belt arrangement here employed optionally has the additional feature of incorporating therewith means physically associated with the belt and arrangeable to accomplish the secondary dimensional sensing, thereby eliminating complicated cam drive arrangements referred to above.

While in the preferred embodiment illustrated the belt is of metallic construction and thereby easily utilized to complete an electrical circuit, it will be understood that other belt materials may reasonably be employed. For example, a belt may be of any suitable plastic material, surface impregnated to provide electrical current-carrying capacity. Alternatively, and depending upon the hole sensing device employed in a particular embodiment, the belt construction may employ other physical characteristics such as the capacity to reflect light or transmit light in the event a photoelectric reading device is employed. Other arrangements reasonably will occur to those skilled in the art.

Another unique feature of the disclosed arrangement is the provision of a variable drive control which materially increases the efficiency of the card reading operation by controllably varying the speed of the operative belt relative to the specific functioning of the equipment at any given point of time. Specifically, the arrangement automatically provides for a relatively low speed operation during the operation of card pickup and a subsequent speed increase during the card reading sequence of the operative cycle. Thus, provision is made for an appropriate control consistent with the operation to be performed which directly contributes to an increased machine efficiency.

It will thus be understood that the disclosed arrangement meets the basic functional requirements of a device of this nature. That is, it provides a means of sensing an appropriate aperture in an information card, including accurately pin-pointing the locale of the given aperture within the determined area of the card. Further, the disclosed equipment has the inherent ability to read a multiplicity of cards within a relatively short period of time.

These and other features and advantages of the disclosed invention will become apparent in the course of the following description and from an examination of the associated drawings, wherein:

FIGURE 2 is a sectional view taken along line 2—2 of FIGURE 1;

FIGURE 3 is a sectional view taken along line 3—3 of FIGURE 1;

FIGURE 4 is a fragmentary detailed view illustrating a typical brush-belt contact;

FIGURE 5 is a sectional view taken along line 5—5 of FIGURE 1;

FIGURE 6 is a typical electrical diagram which may be employed in the invention;

FIGURE 7 is a fragmentary detail view taken along line 7—7 of FIGURE 5;

FIGURE 8 is a fragmentary perspective view similar to FIGURE 1 and illustrates an alternate logic control arrangement that may be employed with the herein disclosed invention; and FIGURE 9 is a schematic electrical diagram illustrating an alternate function that may be utilized with the logic control arrangements heretofore described.

Figure 1:
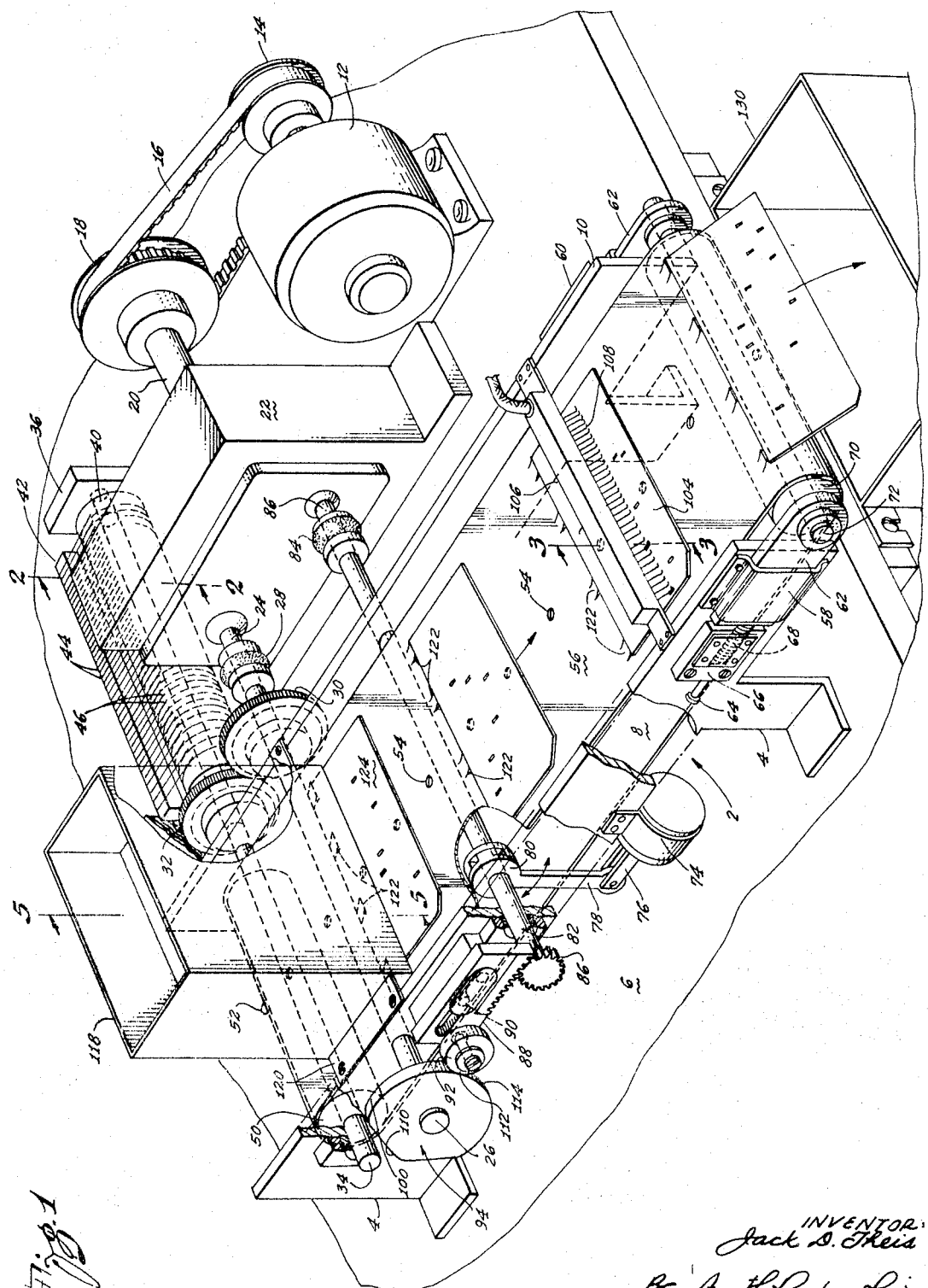
FIGURE 1 is a perspective, partially fragmentary view of a typical embodiment of the invention.

For a better understanding of the invention, attention is initially directed to FIGURE 1 which illustrates, in perspective, partially fragmentary view, a suggested embodiment thereof. The equipment may employ a base frame indicated generally at 2 and having provided thereon support legs 4 whereby the equipment may be conventionally carried on an associated table 6. More specifically, the equipment includes side ribs 8 and 10 extending generally longitudinally of the device and in spaced parallel relationship to each other. The table 6 supports, adjacent the machine 2, a power source 12 which may be a conventional electric motor. The power source 12 is provided with a sheave 14 extending from the motor shaft side thereof, said sheave being in operative engagement with a power transmission belt 16, the latter engaging a driven sheave 18 associated with an input shaft 20 of a gear box indicated generally at 22. It will be noted that the sheaves 14 and 18 are preferably of the non-slip tooth variety, and accordingly, the transmission belt 16, is also provided with operatively related teeth whereby power is transmitted from the motor 12 to the input shaft 20 without loss due to slippage.

The transmission 22 may be of any conventional variety which is commercially available on the market today, but, as will hereinafter appear, it is preferred that the transmission have certain operational characteristics which accommodate variable output speed in response to certain operating characteristics of the basic equipment. Accordingly, the transmission 22 is not shown in detail in view of the fact that a suitable device is, in fact, commercially available under the trade name "ZERO-MAX." This specifically referred to transmission equipment does, in fact, have the operating characteristics required, as will hereinafter appear.

The transmission 22 is provided with an output shaft 24, said output shaft 24 being coupled to a cam drive shaft 26 by virtue of a conventional demountable coupling 28. The shaft 26 is provided with a first drive gear 30 which is fixedly mounted thereon for rotation therewith, said drive gear being in continuous operative engagement with a driven gear 32 fixedly mounted for rotation on secondary shaft 34. It will be understood that the secondary shaft 34 as well as the output shaft 26 are conventionally journalled for rotation within the ribs 8 and 10. The shaft 34 additionally extends rearwardly of the gear 22 and has journalled at its opposite end an understanding plate 36 whereby the entire shaft 34 is rotated under the driving action of the gear 30. Intermediate the gear 32 and the plate 36, the shaft 34 has mounted thereon a clock or timer drum 40. The drum 40, while being fixedly mounted to the shaft 34 for rotation therewith, may be adjustably rotated on the shaft in any conventional manner to provide the appropriate synchronization with card motion as will hereinafter appear.

Adjacent drum 40, a commutator bar 42 is provided. Specifically, the commutator bar 42 has mounted thereon a plurality of conducting fingers or brushes 44, 44, said brushes extending outwardly from the bar 42 for physical engagement with the drum 40 (FIGURE 2), and particularly with annular tracks 46 defined in the surface of the drum. In this connection, it will be understood that the clock drum 40 is preferably manufactured from a non-conducting material which, for this purpose, a phenolic hose or cylinder has been found ideal. Additionally, the tracks 46 formed in the drum are preferably manufactured by an etched metal process whereby each track may, by controlled metallic etching, be operatively associated with certain electrical control circuits so as to provide a variable conductive path depending upon the quality of etching and thereby provide a standard, that is, coded information which may be correlated with the over all system logic.

At the opposed end of shaft 34, a drive drum 50 is provided, said drive drum 50 being fixedly connected (not shown) to the shaft 34 for rotation therewith. The drive drum 50 may be formed of a metallic material so as to be conductive where the particular design is such that low voltage control is used and the machine frame may operate as the ground side of the line. The drive drum 50 has provided thereon a plurality of bosses or pins or the like indicated at 52. The pins 52 are so spaced on the drive drum 50 so as to register with spaced apertures 54 which may be suitably arranged, centrally or otherwise, on a metallic card-carrying belt indicated generally at 56. In this manner, rotation of the shaft 34 and the fixed drum 50 is transmitted to the metallic belt 56 providing the motion thereof, hereinafter described.

At opposed ends of the side ribs 8 and 10, brackets 58 and 60 are mounted. Each of the brackets comprises a slide element or plate 62 clamped to the respective side ribs 8 and 10 for longitudinal motion relative thereto. Specifically, the arrangements include a drive pin 64 extending through a housing 66 and into abutting engagement with the rear end of the slide plate 62. A spring 68 is located on the pins 64 so as to be compressively interposed between the housing 66 and the plate 62, thereby urging the latter longitudinally outwardly of the device. The plates 62 carry an idler drum 70, said idler drum 70 being fixedly secured to a shaft 72, said shaft 72 being journalled for rotation at its opposed ends within its respective plates 62. Again, the idler drum 70 may be manufactured from any suitable material and any appropriate plastic material or metallic structure may be employed. It will thus be apparent that by virtue of the biasing action of the plates 62, the idler drum 70 maintains the metallic belt 56 in tensioned operative engagement between itself and the drive drum 50, it being understood that the metallic belt 56 is continuous in nature and extends around the respective drums 50 and 70 for rotative movement therearound, as will hereinafter be described.

Considering the power and motion requirements of the device illustrated, it will be understood that a solenoid 74 is fixedly mounted to the side rib 8 and has extending therefrom solenoid shaft 76. Solenoid shaft 76 is pivotally connected to the lower end of a starter dog arm 78. The dog arm 78 extends upwardly for a lost motion connection 80 to shaft 82. Shaft 82 is journalled for rotation at opposed points in the ribs 8 and 10 and extends intermediate the continuous belt 56 and outwardly from the side ribs 8 and 10. The shaft 82 is provided with a conventional coupling 84 which secures it to control shaft 86, the latter extending inwardly of the gear transmission 22 and operatively associated therewith as will hereinafter appear. Adjacent the dog arm 80, a shaft 82 is provided with gear 86, the latter being in operative engagement with rack 88 which, in turn, is conventionally mounted on the side rib 8 as, for example, by pin and slot connection 90 and for longitudinal movement relative to said rib. The rack 88 is provided with a rotatable cam follower 92 pivotally mounted at the rear end thereof, said cam follower 92 being in operative cammed engagement with a speed control cam 94, the latter being fixedly mounted on the outer end of shaft 26 for rotation therewith. Additionally, the rack 88 may be spring biased in any conventional manner (not shown) to maintain the follower 92 in intimate engagement with the surface of its drive cam 94.

In the position illustrated in the drawings, the dog arm 78 and connected shaft 80 are in neutral position whereby, upon energizing of the motor 12, the transmission 22 is likewise in neutral position and power is not transmitted to its output shaft 24. Accordingly, the operative parts of the device remain motionless. When it is desired to transmit power throughout the entire arrangement, the solenoid 74 is energized, rotating the dog arm 78 and connected shaft 82 to a first power position, it being understood that the rotation of the shaft 82 and connected shaft 86 position the transmission 22 to provide said first power output speed. Under this circumstance, the output shaft 24 and connected shaft 26 are urged to rotate. Rotation of the shaft 26, of course, transmits motion by virtue of drive gear 30 and driven gear 32 to the secondary shaft 34 and rotation of the latter is transmitted to the metallic belt 56 by virtue of the sprocket engagement 52 with the belt. Thus, the belt is urged to continuously rotate. Additionally, rotation of the shaft 26 causes concurrent rotation of the cam 94 which, upon engagement of the cam 94 with its high land 100, the cam follower 92 will urge the rack 88 to move longitudinally of the side rib 8 and toward the front segments of the machine. Movement of the rack 88 in geared engagement with the pinion 86, of course, induces further rotation of the shaft 82 and consequent rotation of the shaft 86 of the transmission 22.

This last mentioned action shifts the transmission to high output speed inducing a relatively rapid motion in the metallic belt 56. Characteristically, this high output speed and rapid motion of the belt 56 occurs during the card reading portion of the cycle. For example, and as illustrated in FIGURE 1, the card 104 is shown in reading position underneath armature 106. Specifically, armature 106 is provided with a plurality of brushes 108, 108 in determined relation with the passing card 104. Accordingly, some of the brushes will read card information during this rapid period of cycle and, as will hereinafter be described in detail.

The rapid action of the transmission 22 and consequent relatively fast motion of the belt 56 occurs, in the preferred embodiment, during approximately 180° of rotation of the cam 94. Thus, while the high land 100 engages cam follower 92, urging the rack 88 forwardly and the shaft 82 to its forward position, continued rotation of the cam 94 brings fall 110 of the cam 94 into engagement with a cam follower 92. At this point, the rack 88 is biased rearwardly, rotating the shaft 82 in a counterclockwise direction, thereby decreasing the output speed of the transmission 22 and particularly the speed of the output shaft 24. With this reduction in speed, the motion of the metallic belt 56 steplessly reduces until the land 112 of the cam is reached, whereat the output of the transmission 22 is at its lowest rate of the cycle. Thereafter, the rise 114 of the cam 94 is contacted, reversing the motion of the rack 88 and gradually increasing the output of the transmission 22, again steplessly, and consequently the rate of motion of the metallic belt 56.

A specific function of the rather pronounced speed slow-down of the metallic belt 56 relates to the necessity of sequentially picking up cards to be read. For example, a card storage canister 118 is provided and is secured on opposed ends thereof as, for example, at 120 to the respective side ribs 8 and 10. Cards typically are stored in the canister 118 in plane or abutting condition (FIGURE 5) and extend downwardly to immediately overlie the surface of the metallic belt 56. Additionally, the metallic belt 56 is provided with punched or upset distortions 122 which are generally aligned transversely of the belt and extend upwardly from the surface of the metallic belt a determined distance. As an alternate to the distortions, any appropriate abutment may be physically secured to the belt to accomplish card pick-up function. For example, employing the usual information card frequently used in business today, it has been found that these distortions may project upwardly from the surface of the belt approximately .004 inch. Each series of distortions 122 are in determined spacial relationship from each other on the surface of the belt 56. It will thus be understood that, characteristically, a plurality of distortions 122 approach underlying registry with the card carrying canister 118 as the rotation of the cam 94 brings the entire mechanism to its "slow speed" condition. Thus, as a series of distortions 122 pass under the canister 118, the lowermost card in the canister is picked up by edge-abutting engagements with the lower most card whereby the card is urged to move along with the motion of the belt 56. An adjustable "anti-double" device 119 (FIGURES 5 and 7) is positioned on the front of the canister 118 and comprises a plate 121 variably secured by the screw 123 so that its lower edge 125 may be variably positioned in determined relation to the upper surface of the belt 56. This structure permits the selection of a single card by motion of the passing belt. This operation is illustrated by the card 124 which in FIGURE 1 is shown just leaving the canister 118. As soon as the card 124 is picked up, the continued rotation of the cam 94 increases the speed of the entire arrangement and, during this high speed motion, a card such as that illustrated at 104, is being read at the read-out station indicated. Brush contact through an aperture in a card is detailed in FIGURE 4. Thereafter, and before the next sequential card approaches the read-out station, the speed of the entire arrangement is slowed down, as above described, and another card is picked up from the card carrying canister 118.

It will be apparent to those skilled in the art that controlling speed in the manner described has the unique beneficial effect of providing proper control incident to the particular function of the machine at any given point in time. For example, the read-out function of the machine is characteristically rather automatic and can be done rapidly and, accordingly, during the read-out portion of the cycle, the machine is geared to move at an optimum rate. On the other hand, the card pick-up function of the machine, and in order to avoid errors due to multiple card pick-up or potential card jamming is characteristically accomplished during the relatively short incident of slow machine speed. As soon as card pick-up and location become a fact, machine speed is urged to increase, thereby completing the read-out portion of the cycle for one of the cards heretofore picked up by the belt. This unique feature of the disclosed equipment provides the novel result of a substantial improvement in the over all efficiency of the equipment. Adjacent the front of the machine, the card receiving hopper 130 may be provided, said hopper 130 being secured to the table 6 so as to have its upper open end in immediate alignment with the trailing edge of the belt 56 as it partially encircles the idler roller 70. Thus, after read-out of a given card, the card is carried by the belt 56 to its effective terminus and thereupon is disposed within the hopper 130 and in the order in which the cards were read.

Directing attention to FIGURE 8, it will be noted that a slightly modified embodiment of the invention is here illustrated. Considering the fact that a major portion of the structure is identical with that described in the earlier embodiment, it will be understood that identical numerals are here utilized to identify identical structure. In this embodiment, a card transporting belt is indicated by the numeral 56a. The general construction of the belt from the standpoint of card transport as well as primary read-out is identical to that heretofore described. Additionally, however, the belt 56a is provided with an elongated strip segment 150 along one side thereof. The segment 150 is arranged in determined increments 152, 154 and 156, said increments being physically arranged in adjacent predetermined relationship to appropriate areas of the belt which are arranged to pick up and transport information cards. An additional facet of the structure relates to the fact that a secondary commutator bar 158 is provided and arranged to overlie the elongated edge segment 150 of the belt. The commutator bar 158 may be provided with a plurality of brushes 160, 160, the number of brushes being dictated by the functional control required on any given machine. That is to say, any number of additional brushes 160 may be provided depending upon the information or logic control required and also depending upon the additional control desired in a particular unit, as will hereinafter appear from an exemplary illustration. Each of the control segments 152, 154 and 156 of the elongated edge portion 150 may be provided with a plurality of control portions indicated by the numeral 162. It will be noted that the portions 162 are longitudinally aligned with the brushes 160 of the secondary commutator 158 so that by normal belt motion they pass under one of the related wire brushes 160. In a preferred embodiment of the invention, the elements 162 comprise insulating material bonded to the edge segment 150 in a predetermined logical order in relation to each other as well as in relation to the physical dimensions normally expected on the adjacent transported card. In this way, the respective brushes 160 periodically, during belt motion, engage an insulating portion and thereafter the belt per se to make electrical contact therewith and thereby make and break an appropriate electrical circuit to achieve a desired result. For example, one of the brushes 160 could sequentially engage an insulating portion and then a belt portion to provide second dimensional location information by completion of a secondary electrical circuit correlated with the completion of a primary electrical circuit by one of the brushes of the armature 106. If desired, the insulating elements 162 may be arranged for demountable association with the edge segment 150 of the belt so that field adjustments on the equipment may readily be made and a variation in the logic pattern of the equipment easily achieved.

An additional utilitarian function of the secondary control arrangement described immediately above relates to the possible utilization of one or more of the wire brushes 160 and an associated electrical circuit to control, for example, a device, equipment or operation which may logically be either directly associated with the particular card reading equipment or a device external thereto, as the requirements of a particular application admit. For example, attention is directed to FIGURE 9 which schematically illustrates one of the brush elements here indicated by the numeral 160a. The brush element 160a may complete a circuit through, for example, a relay 170. While the relay 170 may be electrically interlocked with a totalizer arrangement associated with the machine and not shown but which could, within the purview of one skilled in the art be arranged to provide sub-total reading at a determined point in belt motion. Alternately, an external controlled device such as a warning light or bell to advise the machine operator of immediate machine cycle completion could be energized in the same manner. An external control of this nature could also be utilized to effectuate the introduction of a secondary series of information cards and the halting of the transport of a first series of information cards. Other possibilities will reasonably occur to those skilled in the art.

The disclosed invention is by way of illustration and not limitation and may be subject to variations without departing from the scope of the appended claims.

I claim:
1. In an information retriever,
a power source,
a stepless variable speed drive associated with the power source,
a plurality of rollers in spaced relation to each other,
an endless metallic belt operatively associated with the rollers for motion therearound,
means operatively connecting the drive with the rollers whereby power for rotation of the rollers is supplied thereto,
a source of information cards having informative apertures therein,
means to selectively position the information cards on the belt for sequential motion therewith,
and means including a plurality of electrically conductive brushes positioned in operative relation to said metallic belt and being normally biased toward said metallic belt for engagement therewith by flexure through individual apertures in a passing card, to sense location of said apertures in such a card when passingly carried by said belt.

2. In an information retriever,
a plurality of rollers in spaced relation to each other,
a metallic belt endlessly positioned around the rollers to present an upper surface intermediate the rollers,
means to transmit rotative motion of the rollers to the belt to induce motion of the latter,
a source of information cards having apertures therein indicative of the information stored thereon,
means to position and sequentially carry cards on the belt in determined relation to each other,
and brush means positioned above the upper surface of the belt and extending flexibly downwardly and arranged to physically engage the belt upon the appearance of an aperture in a card passing the brush means.

3. In an information retriever according to claim 2, and including means to controllably vary the rate of motion of the belt in response to the position of the cards relative to said brush means.

4. An information retrieving machine according to claim 3,
wherein said means to position the cards on the belt comprises a plurality of aligned deformations within the surface of the belt.

5. In an information retrieving machine,
a power source,
a variable speed transmission operatively driven by the power source,
control means on the transmission to vary the output speed thereof,
a source of information cards having apertures therein related to the information stored on the card,
a read-out device comprising a plurality of wire brushes in logical alignment to the apertures appearing on the cards,
means to support the cards and sequentially carry same past said read-out brushes,
a cam and cam follower arrangement operatively associated with the output shaft of said drive for movement thereby, and means to translate the varying motion of said cam and cam follower arrangement to said control means to thereby vary the output of said drive.

6. In an information retriever,
a power source,
a variable speed drive arrangement operatively connected to the power source,
an output shaft from said variable speed drive arrangement,
a control shaft movable to vary the output speed of said output shaft,
a pair of spaced rollers,
an endless metallic belt spaced over the rollers and movable therewith,
power transmission means operatively interconnecting said output shaft and at least one of the rollers to induce rotation of the latter,
sprocket means on at least one of the rollers operatively associated with the metallic belt whereby rotation of the roller induces rotation of the belt,
a source of information cards comprising a container mounted immediately above the upper surface of the belt and in determined relation thereto, a plurality of aligned deformations on the belt, said deformations being operative to engage the lowermost card in said canister and carry same along the upper surface of the belt, variable cam means operatively associated with the output shaft of said drive, means operatively interconnecting the cam means and said control shaft whereby rotation of said cam means is effective to vary the position of said control shaft and vary the output speed of said output shaft, and brush means positioned immediately above the upper surface of said belt and in logical alignment with apertures appearing in said cards, and a card receptacle adjacent one of said rollers and arranged to sequentially receive said cards after the belt has carried the card past said brush means.

7. An information retriever according to claim 6, wherein one of said rollers is flexibly mounted relative to the other of said rollers and normally biased away therefrom to maintain appropriate tension in the belt.

8. In an information retriever device, a powered variable speed drive, an elongated belt, said belt including an operative surface of electrically conductive material, a source of information cards comprising a card supporting arrangement mounted immediately adjacent the operative surface of the belt and in determined relation thereto, power transmission means interconnecting the variable speed drive and the belt and arranged to induce belt motion, means on the belt to selectively obtain individual cards from said source and transport said cards concurrently with the motion of the belt, a card receptacle adjacent one end of the belt and arranged to sequentially receive cards transmitted by the belt, and readout means comprising a plurality of brushes arranged generally transversely to the belt and in predetermined alignment and being normally biased in the direction of the belt, said brushes being operative to engage apertures in a card when passing on said belt.

9. An information retriever according to claim 8, wherein said read-out means additionally includes a second plurality of brushes normally biased toward said belt, said belt having an elongated segment thereon movably related to said second brushes, said elongated segment of said belt being provided with insulating areas to accommodate a logical and sequential engagement and disengagement of said second brushes with said belt.

10. In an information retriever, an endless belt mounted for continuous motion on the retriever, power means operatively connected to and arranged to impart motion to said belt, a source of information cards, means to selectively and sequentially deposit cards from said source in determined relation on said belt for motion with said belt, and read-out means carried by the retriever in operative association with said belt, said read-out means comprising a first read-out means arranged to logically scan the cards carried therepast by the moving belt, a second read-out means positioned in determined relation to said first read-out means and operative to scan an elongated segment of the belt in spaced relation to that portion of the belt carrying the cards, said elongated segment of the belt having indicia formed and arranged thereon to controllably vary the sensing of said second read-out means.

11. An information retriever according to claim 10, wherein said second read-out means includes control means operatively associated with indicia on said elongated belt segment and arranged to energize a controlled device in determined relation to the motion of the belt.

12. In an information retriever, the combination comprising:

a storage container for a stack of information bearing cards and being open on at least one side for removal of the respective card positioned at said open side from said stack of cards;

an endless belt including projecting means, said belt positioned relative to said open side of said storage container for said projecting means to remove a card from said stack of cards when said projecting means passes said open side;

means for driving said belt; and a readout station positioned relative to said belt to read the information contained on a card when on said belt and advanced by said belt past said readout station.

13. In an information retriever, the combination comprising:

a storage container for a stack of information bearing cards and being open on at least one side for removal of the respective card positioned at said open side from said stack of cards;

an endless belt including projecting means, said belt positioned relative to said open side of said storage container;

means for driving said belt for said projecting means to remove a card from said stack of cards when said projecting means passes said open side, a card when removed by said projecting means temporarily remaining in abutment with said projecting means;

means on said belt defining a code pattern bearing a fixed spatial relationship to said projecting means and to the information content of a card when transported by said belt in abutment with said projecting means; and a readout station positioned relative to said belt to read the information contained on a card when on said belt and advanced by said belt past said readout station.

14. In an information retriever combination comprising:

a storage container for a stack of information bearing cards and being open on at least one side, said one side defining a card removal plane for removal of any card from said stack of cards when in said plane;

a flat conveyor belt having a working area coplanar with said card removal plane;

projecting means on said belt moving therewith and projecting into said card removal plane for removing an individual card from said stack of cards and in a direction extending in said plane;

means for driving said belt; and a readout station positioned relative to said belt to read the information contained on a card when on said belt and when advanced by said belt past said readout station.

15. In an information retriever, the combination as set forth in claim 12 comprising:

said means for driving said belt including means for driving the belt at a variable speed, with the speed of said belt being lower when a card is placed onto it by said projecting means than the speed of the belt when said latter card is passed by said belt through said readout station.

16. An information retriever according to claim 15, wherein said last mentioned means comprises a drive and a cam rotatably driven by the output side of said drive, a movable cam follower operatively associated with a movable rack, control means to vary the speed of the drive and including a shaft having a gear thereon operatively associated with the rack, whereby rotation of said cam varies the position of said last mentioned shaft in response to movable geared engagement between the rack and gear and thereby vary the output of the drive.

References Cited by the Examiner

UNITED STATES PATENTS

| | | | |
|---|---|---|---|
| 2,533,309 | 12/1950 | Blakely | 235—61.11(1) X |
| 2,566,927 | 9/1951 | Carroll et al. | 235—61.11(1) X |
| 2,961,093 | 11/1960 | Rabinow | 235—61.111 X |
| 3,066,798 | 12/1962 | Toulmin | 235—61.115 X |

MAYNARD R. WILBUR, *Primary Examiner.*

D. W. COOK, *Assistant Examiner.*